United States Patent
Clark

(10) Patent No.: US 6,269,529 B2
(45) Date of Patent: *Aug. 7, 2001

(54) HOSE PREPARATION APPARATUS AND METHOD THEREFOR

(76) Inventor: Thomas R. Clark, 9189 Scotch Ridge Rd., Bowling Green, OH (US) 43402

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/376,639

(22) Filed: Aug. 18, 1999

(51) Int. Cl.$^7$ ................ B23Q 7/02; B23Q 1/25; B23P 21/00; B41F 17/28
(52) U.S. Cl. .............. 29/407.04; 29/33 D; 29/33 T; 29/430; 29/563; 29/564.8; 29/720; 269/47; 269/50; 269/57; 101/35
(58) Field of Search ................... 29/33 D, 33 T, 29/407.01, 407.04, 430, 563, 564, 564.1, 564.7, 564.8, 720, 707; 101/35; 269/47, 50, 51, 52, 57

(56) References Cited

U.S. PATENT DOCUMENTS

| | | | |
|---|---|---|---|
| 3,212,185 | * | 10/1965 | Keiter . |
| 3,253,333 | * | 5/1966 | Keiter . |
| 3,795,962 | * | 3/1974 | Baldyga . |
| 3,960,072 | | 6/1976 | Ahlgren et al. . |
| 4,020,719 | | 5/1977 | Houck et al. . |
| 4,029,006 | * | 6/1977 | Mercer . |
| 4,172,429 | * | 10/1979 | Gregorec et al. ............ 101/35 |
| 4,385,426 | | 5/1983 | Vitellaro . |
| 4,669,376 | * | 6/1987 | Dominico et al. . |
| 4,785,656 | | 11/1988 | Kennedy . |
| 5,210,927 | | 5/1993 | Lamont et al. . |

FOREIGN PATENT DOCUMENTS

| | | | |
|---|---|---|---|
| 58-217238 | * | 12/1983 | (JP) . |
| 61-222644 | * | 10/1986 | (JP) . |
| 63-028533 | * | 2/1988 | (JP) . |
| 1-065738 | * | 3/1989 | (JP) . |
| 6-155194 | * | 6/1994 | (JP) ..................... 29/33 D |
| 1742023 | * | 6/1992 | (SU) . |

OTHER PUBLICATIONS

Brochure entitled *Matthews Jet–A–Mark/Linx, Series 6000*, by Matthews International Corporation, dated Mar. 1993, Ref.: HPL7.5M.

Brochure entitled *LINX/CIJ–6200 Data Zone Ink–jet*, by Matthews International Corporation, dated 1998, Ref.: CIJ–6200 5M CD.

* cited by examiner

Primary Examiner—S. Thomas Hughes
Assistant Examiner—Eric Compton
(74) Attorney, Agent, or Firm—Emch, Schaffer, Schaub & Porcello Co., L.P.A.

(57) ABSTRACT

A hose preparation apparatus and method therefor including a supporting device for supporting at least one hose. A printing device is positioned adjacent to the supporting device for printing a symbol on a hose supported by the supporting device. A trimming device is positioned adjacent to the supporting device for trimming a hose supported by the supporting device. The apparatus and method can also include a clipping apparatus, a capping apparatus and an inspecting apparatus.

14 Claims, 9 Drawing Sheets

HOSE PREPARATION APPARATUS AND METHOD THEREFOR

BACKGROUND OF THE INVENTION

The present invention relates to a hose preparation apparatus and a method therefor. More specifically, the invention is directed to an apparatus and method for performing various operations on one or more hoses positioned on a supporting device.

It has been found that there is a need for an apparatus and method that can, among other things, print, trim, clip, cap and inspect a hose in a continuous operation. The present invention satisfies this need.

SUMMARY OF THE INVENTION

The present invention is directed to a hose preparation apparatus having a supporting device for supporting at least one hose. The apparatus further includes a printing device positioned adjacent to the supporting device for printing a symbol on a hose supported by the supporting device. The apparatus further includes a trimming device positioned adjacent to the supporting device for trimming a hose supported by the supporting device.

The hose preparation apparatus of the present invention can also include a clipping device positioned adjacent to the supporting device for positioning a clip on a hose supported by the supporting device. The apparatus can also include a capping device positioned adjacent to the supporting device for capping a hose supported by the supporting device. The hose preparation apparatus can also include an inspection device positioned adjacent to the supporting device for inspecting a hose supported by the supporting device.

The present invention includes a method of preparing a hose including the steps of: supporting at least one hose on a supporting device; printing a symbol on the at least one hose with a printing device positioned adjacent to the supporting device; and trimming the at least one hose with trimming means positioned adjacent to the supporting device.

The method of the present invention can also include the step of clipping the at least one hose with a clipping device positioned adjacent to the supporting device. The method can also include the step of capping the at least one hose with a capping device positioned adjacent to the supporting device. The method of the present invention can also include the step of inspecting the at least one hose with an inspecting device positioned adjacent to the supporting device.

The primary object of the present invention is to provide an apparatus and a method for hose preparation.

Other objects and advantages of the present invention will become apparent to those skilled in the art upon a review of the following detailed description of the preferred embodiments and the accompanying drawings.

DETAILED DESCRIPTION OF THE PREFERRED EMBODIMENTS

Figure 1:
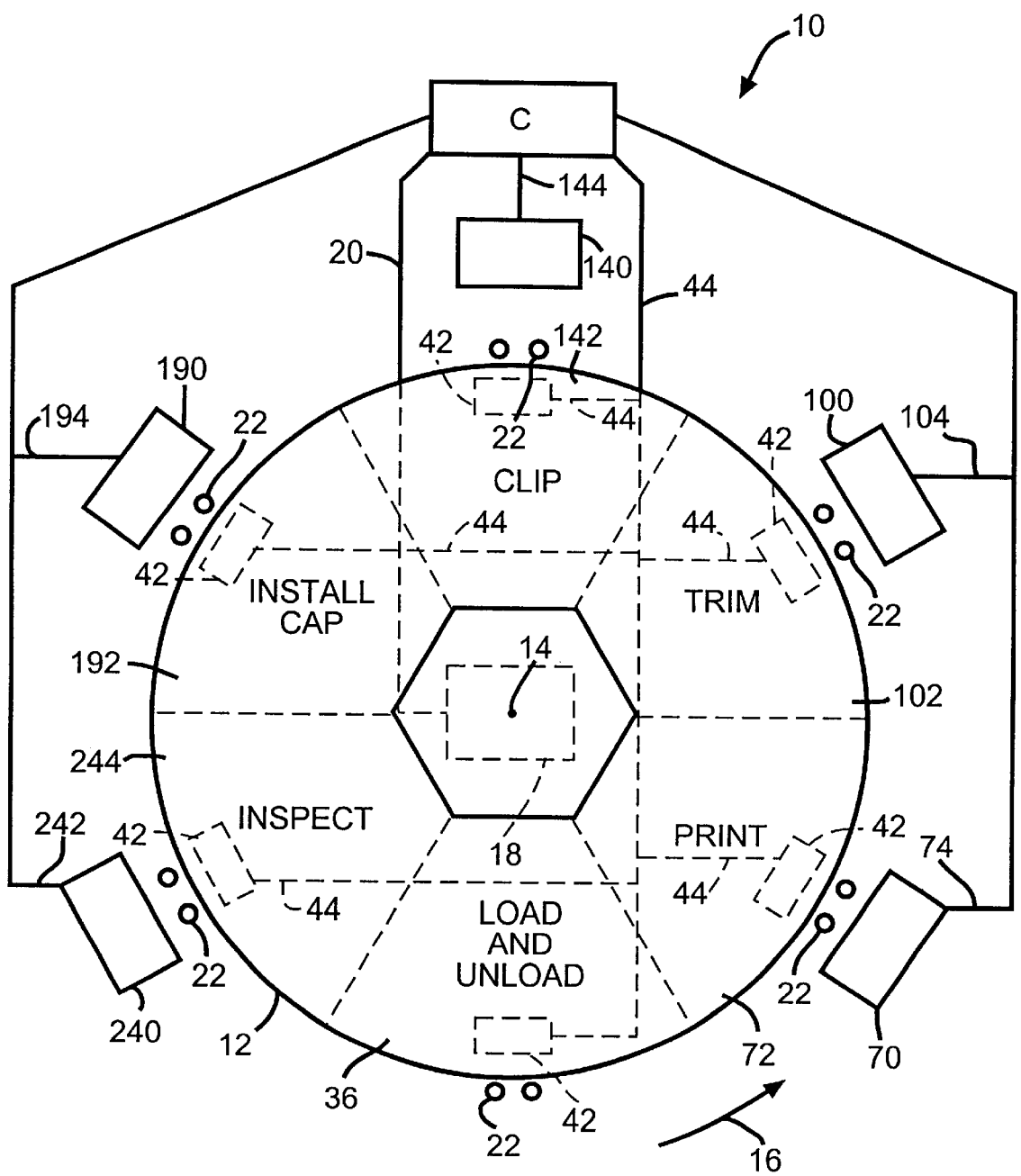
FIG. 1 is a schematic plan view of a hose preparation apparatus according to the present invention.

The preferred embodiments, best mode, apparatus, method, operation and intended use of the present invention will now be described in detail with reference being made to the drawings. In the drawings, the hose preparation apparatus of the present invention is indicated generally by the reference number "10".

Figure 2:
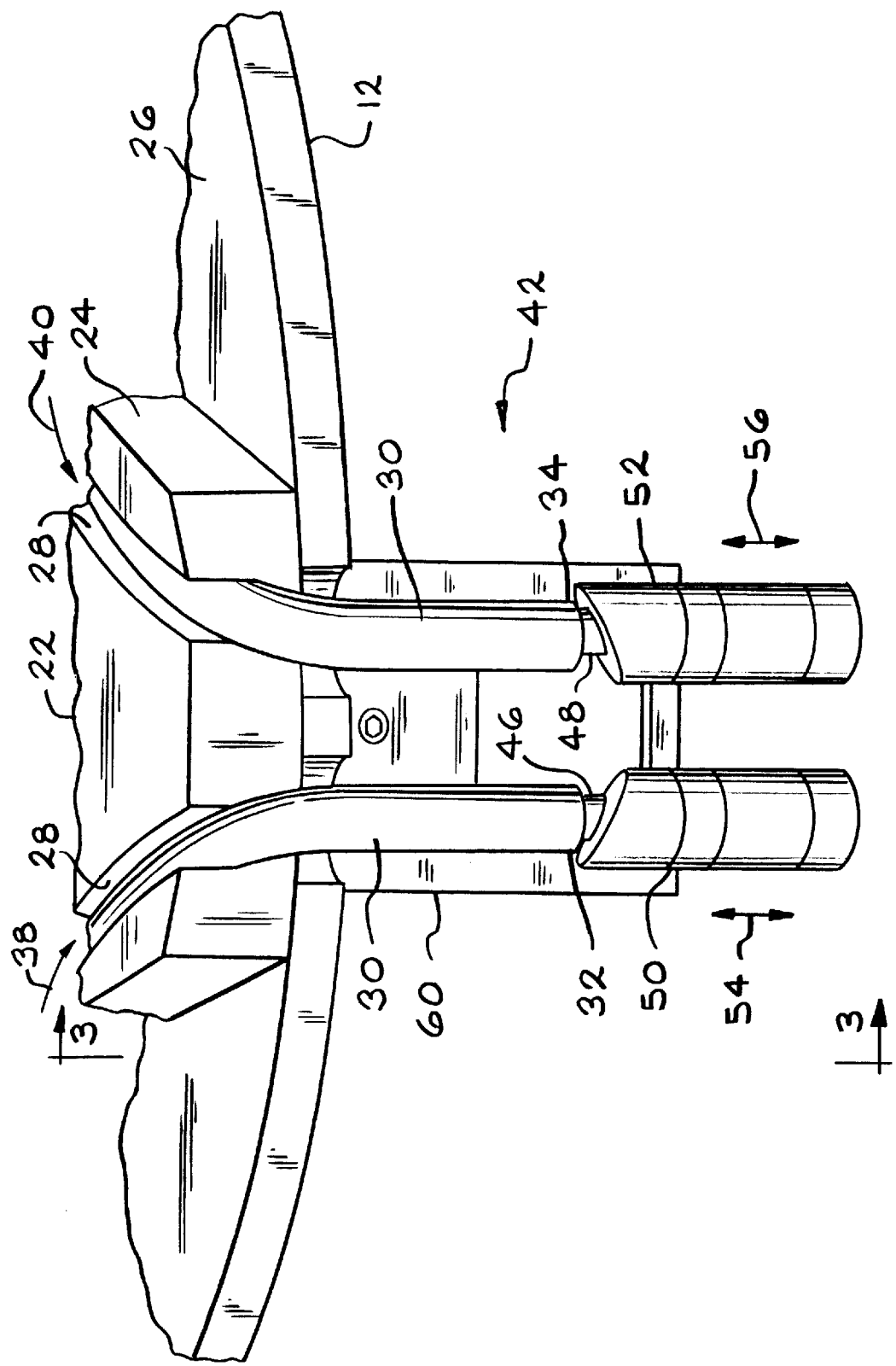
FIG. 2 is a detailed perspective view of a hose fixture according to the present invention with a hose positioned thereon.

Referring to FIGS. 1 and 2, the apparatus 10 includes a rotary table 12 that rotates about an axis of rotation 14 in a direction as indicated by arrow 16 in FIG. 1. The rotary table 12 is actuated by a motor 18 that is in electrical communication with a controller such as a programmable computer C by an electrical line 20. The computer C sends signals to the motor 18 to cause the motor to be turned on or off in order to regulate movement of the rotary table 12. It should be understood that mechanical controllers can also be used depending on the use of the apparatus 10.

As shown in FIGS. 1 and 2, the rotary table 12 includes a plurality of hose fixtures 22. In the embodiment of the invention as shown in FIG. 1, the apparatus 10 includes six hose fixtures 22. However, it should be understood that the number of hose fixtures 22 can vary depending upon the use of the apparatus 10. As shown in FIG. 2, each hose fixture 22 includes a support block 24 that is mounted on a top surface 26 of the rotary table 12. The support block 24 includes a recess 28 adapted to receive and support a hose 30. As shown in FIG. 2, the hose 30 includes a first end 32 and a second end 34. Referring to FIGS. 1 and 2, the hose 30 is placed in the recess 28 at the load and unload station 36 as indicated by the arrows 38 and 40 in FIG. 2.

Figure 3:
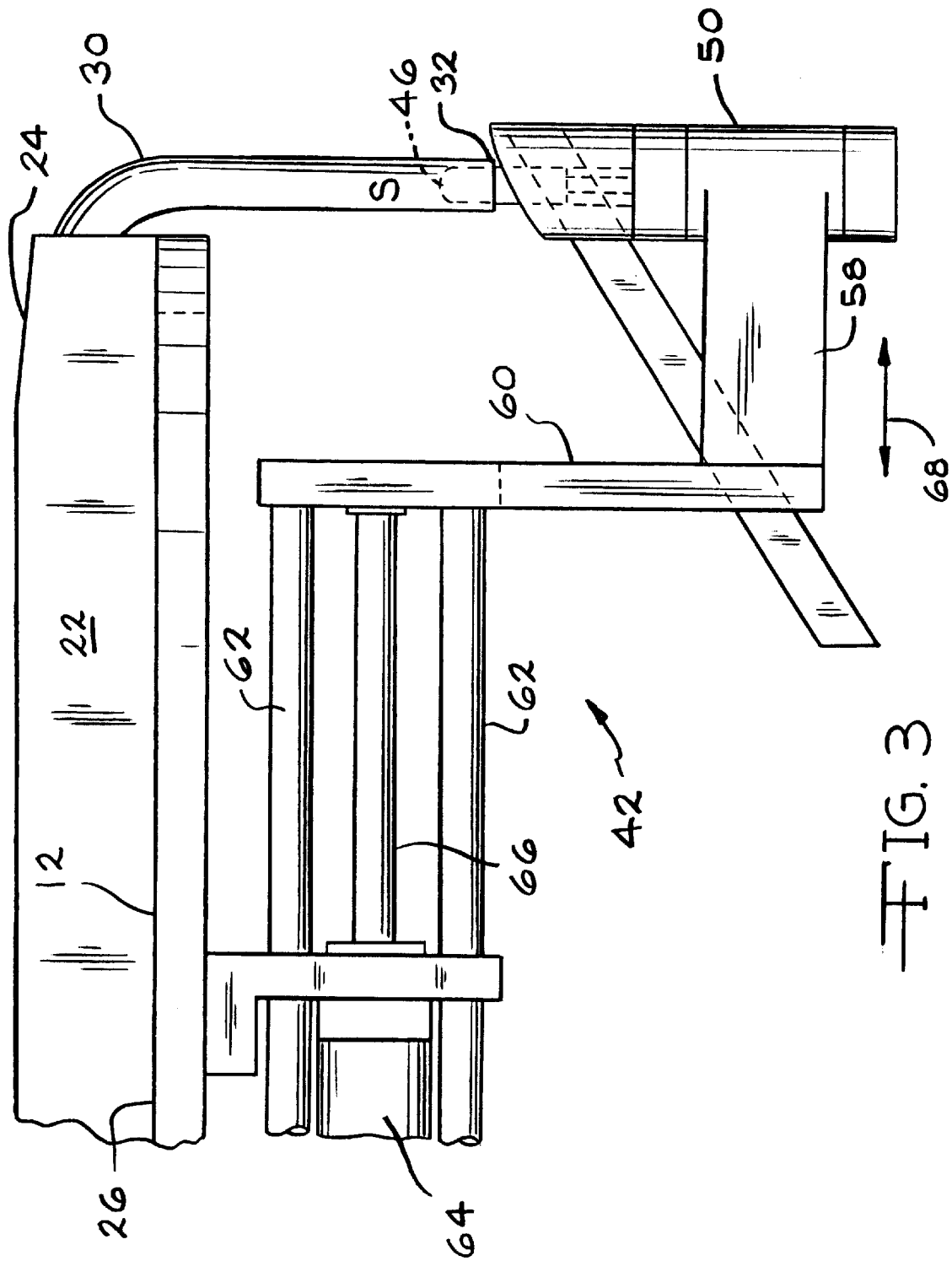
FIG. 3 is a cross-sectional view taken along line 3—3 of FIG. 2.

Referring to FIGS. 1–3, each hose fixture 22 includes a hose end retention apparatus 42 that is in electrical communication with the computer C through electrical line 44 as shown in FIG. 1. Referring to FIGS. 2 and 3, the retention apparatus 42 includes a first retention pin 46 and a second retention pin 48, which are adapted to receive and retain the first and second ends 32 and 34 of the hose 30, respectively. The first and second retention pins 46 and 48 are movably mounted on first and second retention pin cylinders 50 and 52, respectively. The first and second retention pin cylinders 50 and 52 move the first and second retention pins 46 and 48, respectively, in reciprocal vertical directions as indicated by arrows 54 and 56, respectively, in FIG. 2.

Referring to FIG. 3, the first and second retention pin cylinders 50 and 52 are mounted by support arms 58 on a mounting plate 60. The mounting plate 60 is movably mounted on guide rods 62. The mounting plate 60 is operatively connected to a cylinder 64 by a reciprocating rod 66. Actuation of the cylinder 64 causes reciprocating horizontal movement of the first and second retention pin cylinders 50 and 52 in the directions indicated by arrow 68 in FIG. 3.

Figure 4:
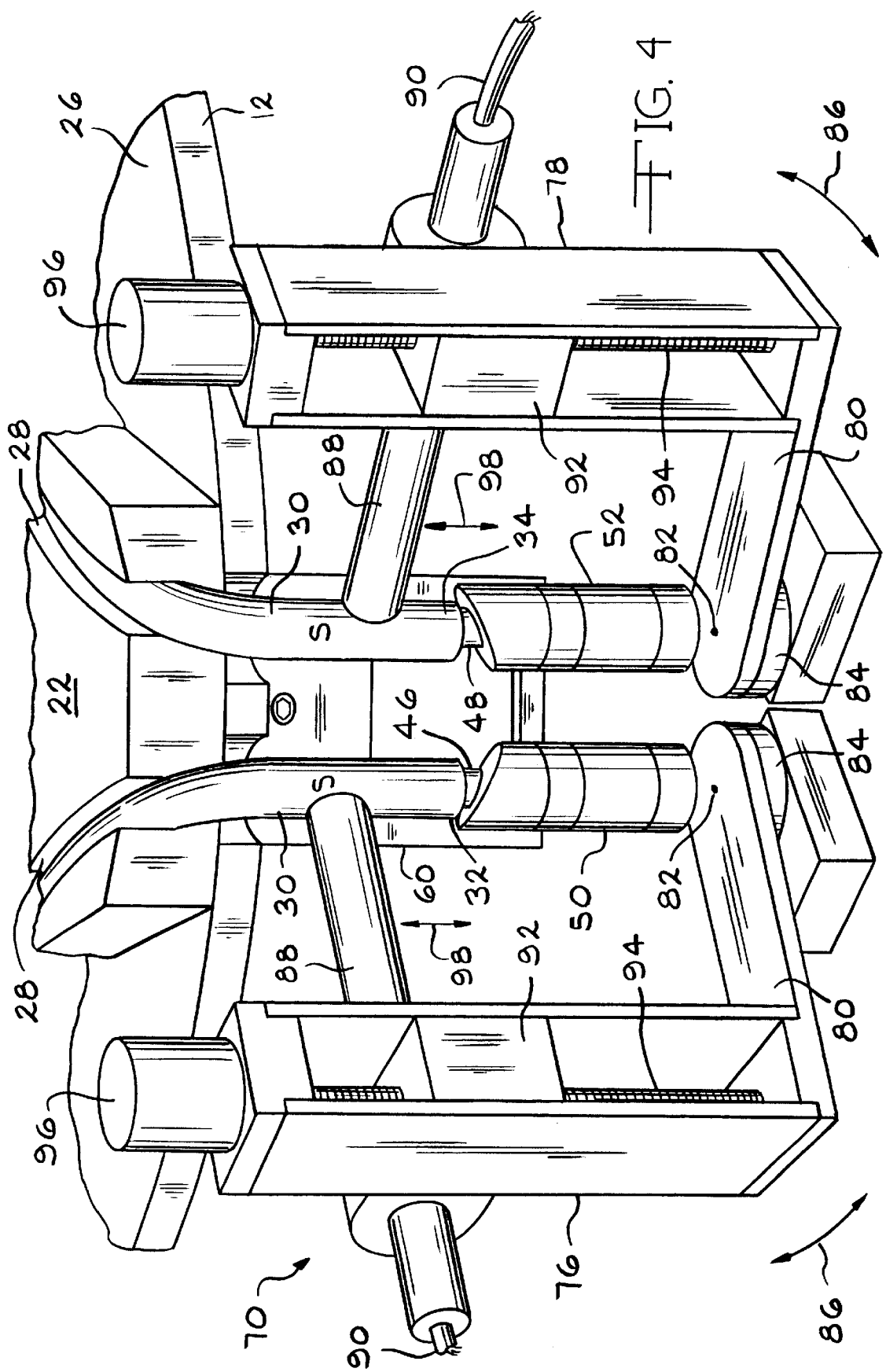
FIG. 4 is a perspective view of a printing apparatus according to the present invention.

Referring to FIGS. 1 and 4, the apparatus 10 of the present invention includes a printing apparatus 70 at a print station 72. The printing apparatus 70 is in electrical communication with the computer C through an electrical line 74. The printing apparatus 70 is positioned adjacent to the rotary table 12.

Referring to FIG. 4, the printing apparatus 70 includes a first printer 76 and a second printer 78 that are positioned adjacent to the first and second ends 32 and 34 of the hose 30. Each printer 76 and 78 includes a printer arm 80 that is pivotally mounted by a screw nut 82 on a first positional encoder 84. The encoder 84 pivots the arm 80 in the directions indicated by arrow 86 in FIG. 4. Each printer 76 and 78 includes a jet printer 88 that is capable of printing a symbol S, such as a letter or a number, on the hose 30. Each printer 88 includes an electrical line 90 that is in electrical communication with the computer C or another programmable computer (not shown). Each printer 88 is mounted on a mounting block 92 that is in turn mounted on a rotatable ball screw 94 that is connected to a second positional encoder 96. Rotation of the ball screw 94 by the encoder 96 causes the printer 88 to move in reciprocal vertical directions as indicated by arrow 98 in FIG. 4.

Figure 5:
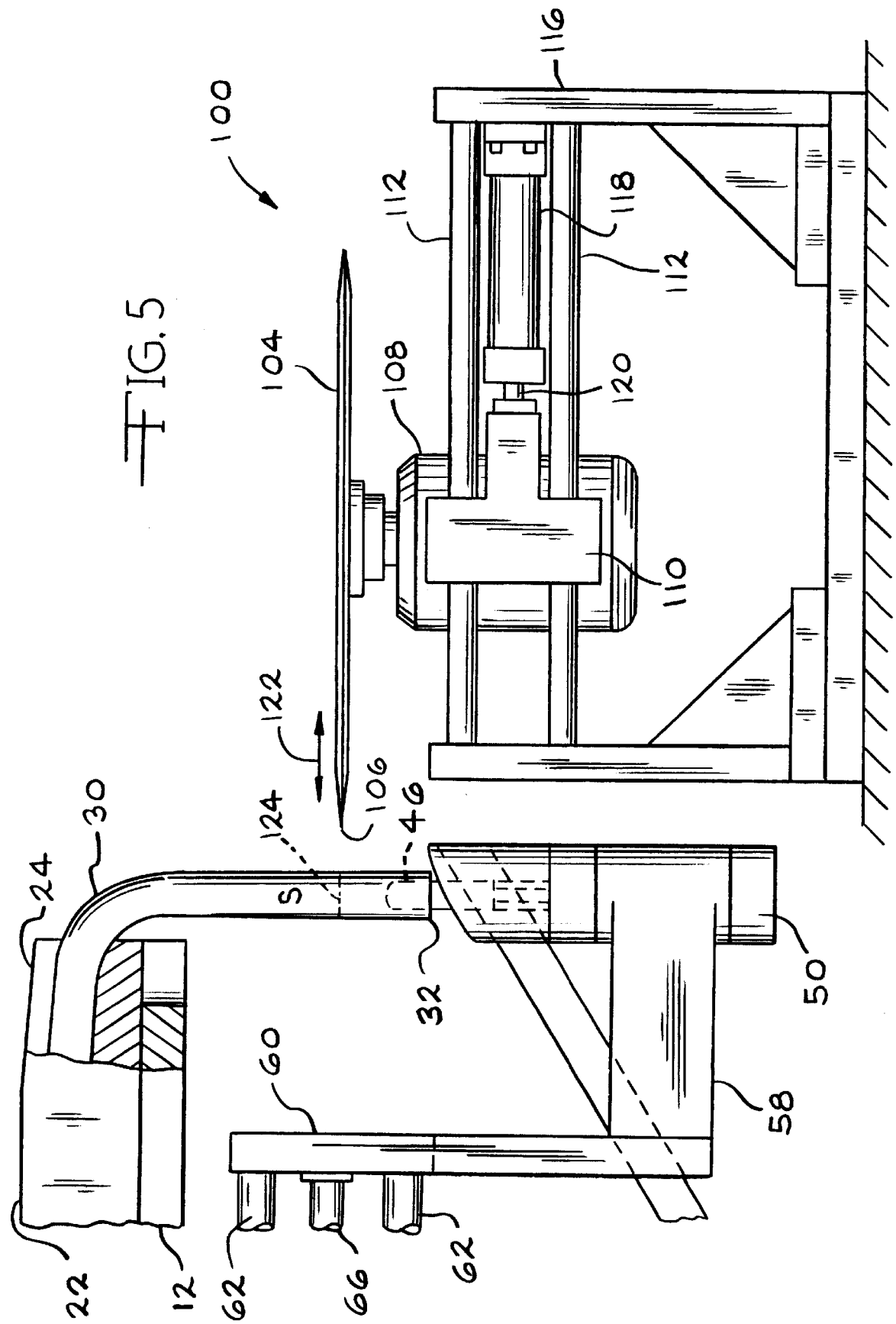
FIG. 5 is a side elevational view of a trimming apparatus according to the present invention.

Referring to FIGS. 1 and 5, the apparatus 10 of the present invention includes a trimming apparatus 100 that is positioned adjacent to the rotary table 12 at a trim station 102. The trimming apparatus 100 is in electrical communication with the computer C through an electrical line 104.

Referring to FIG. 5, the trimming apparatus 100 includes a circular trimming blade 104 having a cutting edge 106 that is rotationally mounted on a motor 108. The motor 108 is movably mounted by a guide block 110 on guide rods 112 of a frame assembly 116. The guide block 110 is connected to a cylinder 118 by a reciprocating rod 120. Actuation of the cylinder 118 causes reciprocal horizontal movement of the trimming blade 104 in the directions indicated by arrow 122 in FIG. 5.

Figure 6:
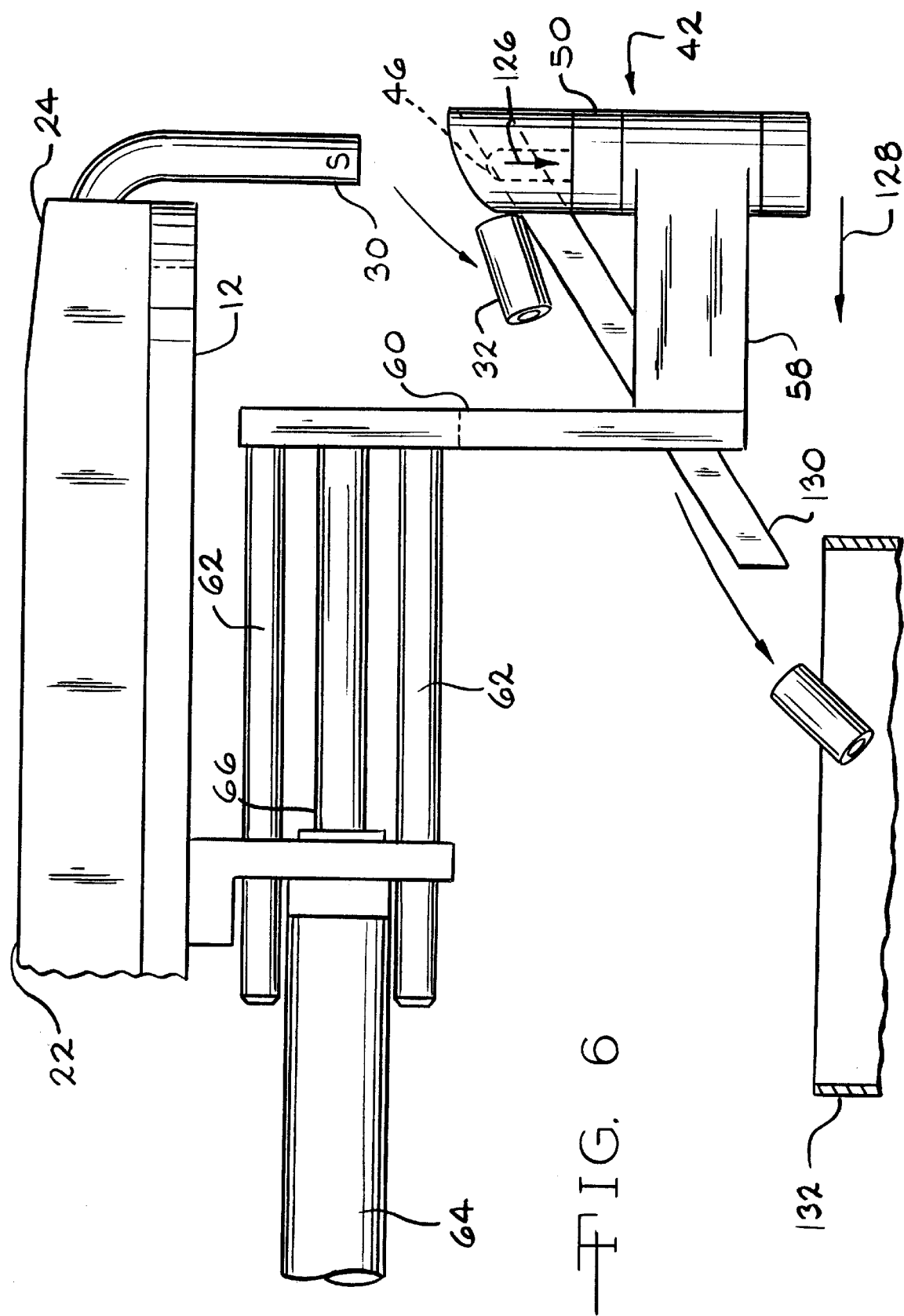
FIG. 6 is a side elevational view similar to the view of FIG. 5 showing the disposal of scrap hose after trimming.

Referring to FIGS. 5 and 6, the rotating trimming blade 104 engages the hose 30 at a point 124 on the hose 30 to trim or remove the first and second ends 32 and 34 from the hose 30. During trimming, the first and second retention pins 46 and 48 retain and support the first and second ends 32 and 34 to allow clean cuts by the cutting edge 106 of the trimming blade 104. Referring to FIG. 6, the first and second retention pin cylinders 50 and 52 are then actuated to cause the first and second retention pins 46 and 48 to move in the direction indicated by arrow 126 in FIG. 6. This results in the removal of the first and second ends 32 and 34 from the first and second retention pins 46 and 48, respectively. The first and second ends 32 and 34 are then allowed to fall by gravity down a chute 130 that is mounted on the hose end retention apparatus 42 into a receptacle 132. The mounting plate 60 is then moved by the cylinder 64 in the direction indicated by arrow 128 in FIG. 6 to cause the first and second retention pins 46 and 48 and their corresponding cylinders 50 and 52, respectively, to be moved away from the hose 30.

Figure 7:
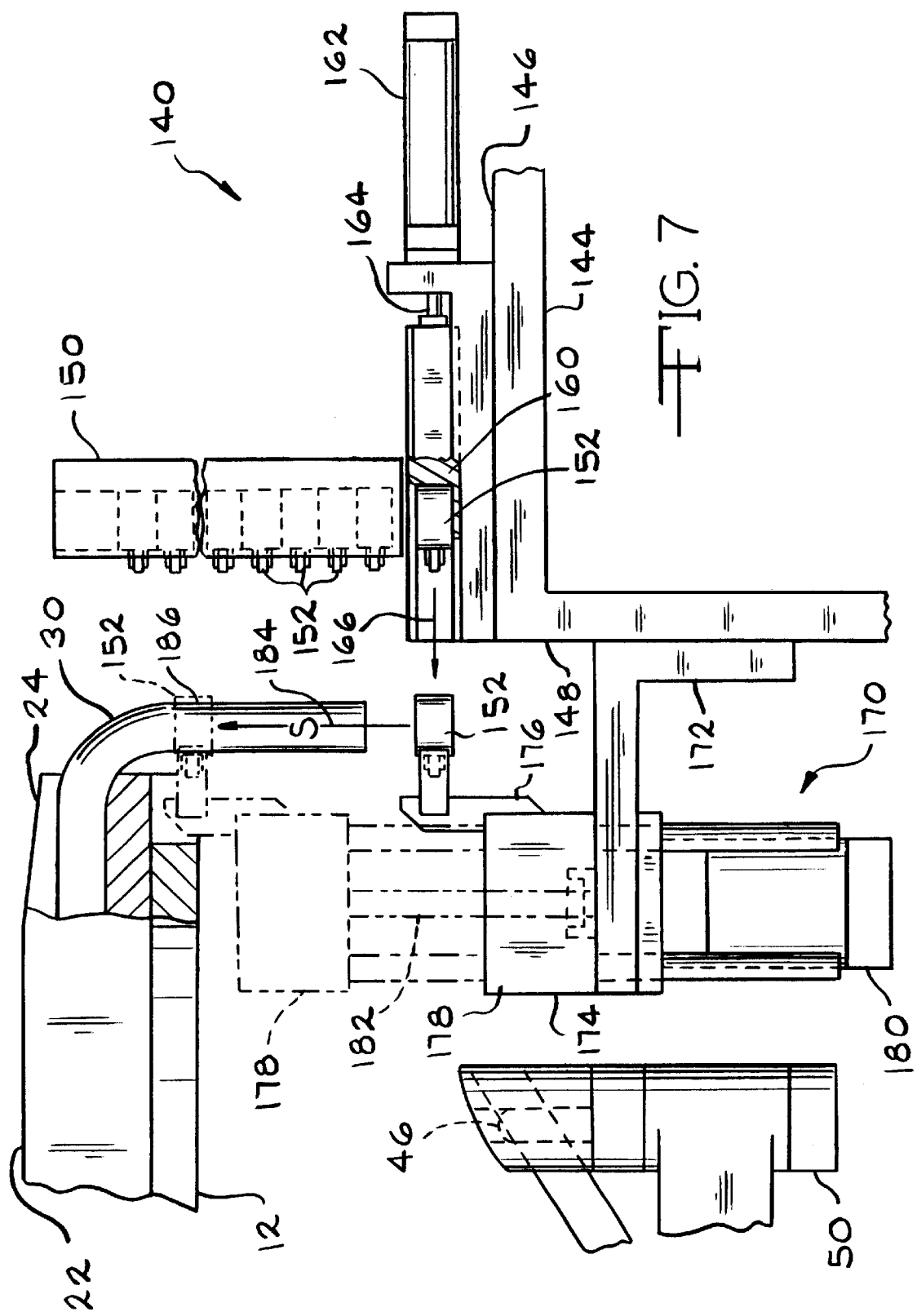
FIG. 7 is a side elevational view of a clipping apparatus according to the present invention.

Referring to FIGS. 1 and 7, the apparatus 10 of the present invention includes at least one clipping apparatus 140 positioned adjacent the rotary table 12 at a clip station 142. The clipping apparatus 140 is in electrical communication with the computer C through an electrical line 144.

Referring to FIG. 7, each clipping apparatus 140 includes a clipping apparatus support frame 144 having an upper surface 146 and a side surface 148. A clip magazine 150 is positioned on the upper surface 146. The clip magazine 150 is adapted to receive a plurality of vertically arranged hose clips 152. The apparatus 140 includes a moveable clip pusher 160 that is connected to a cylinder 162 by a reciprocating rod 164. Actuation of the cylinder 162 causes the clip pusher 160 to push the clip 152 in the direction indicated by arrow 166 in FIG. 7.

Still referring to FIG. 7, each clipping apparatus 140 includes a clip gripper assembly 170 that includes a frame 172 that is mounted on the side surface 148 of the clip apparatus support frame 144. The clip gripper assembly 170 includes a clip gripper 174 having opposing arms 176 that are movably mounted on a body 178 that includes a cylinder (not shown). The cylinder actuates the arms 176 to grip and spread a hose clip 152 that has been received from the clip pusher 160. The body 178 is movably mounted on the frame 172 by a cylinder 180 and a reciprocating rod 182. As shown in FIG. 7, actuation of the reciprocating rod 182 by the cylinder 180 causes vertical movement of the body 178 and thus the arms 176 in the direction indicated by arrow 184. When the arms 176 have been moved to a point 186 on the hose 30, the arms release a hose clip 152 onto the hose.

Figure 8:
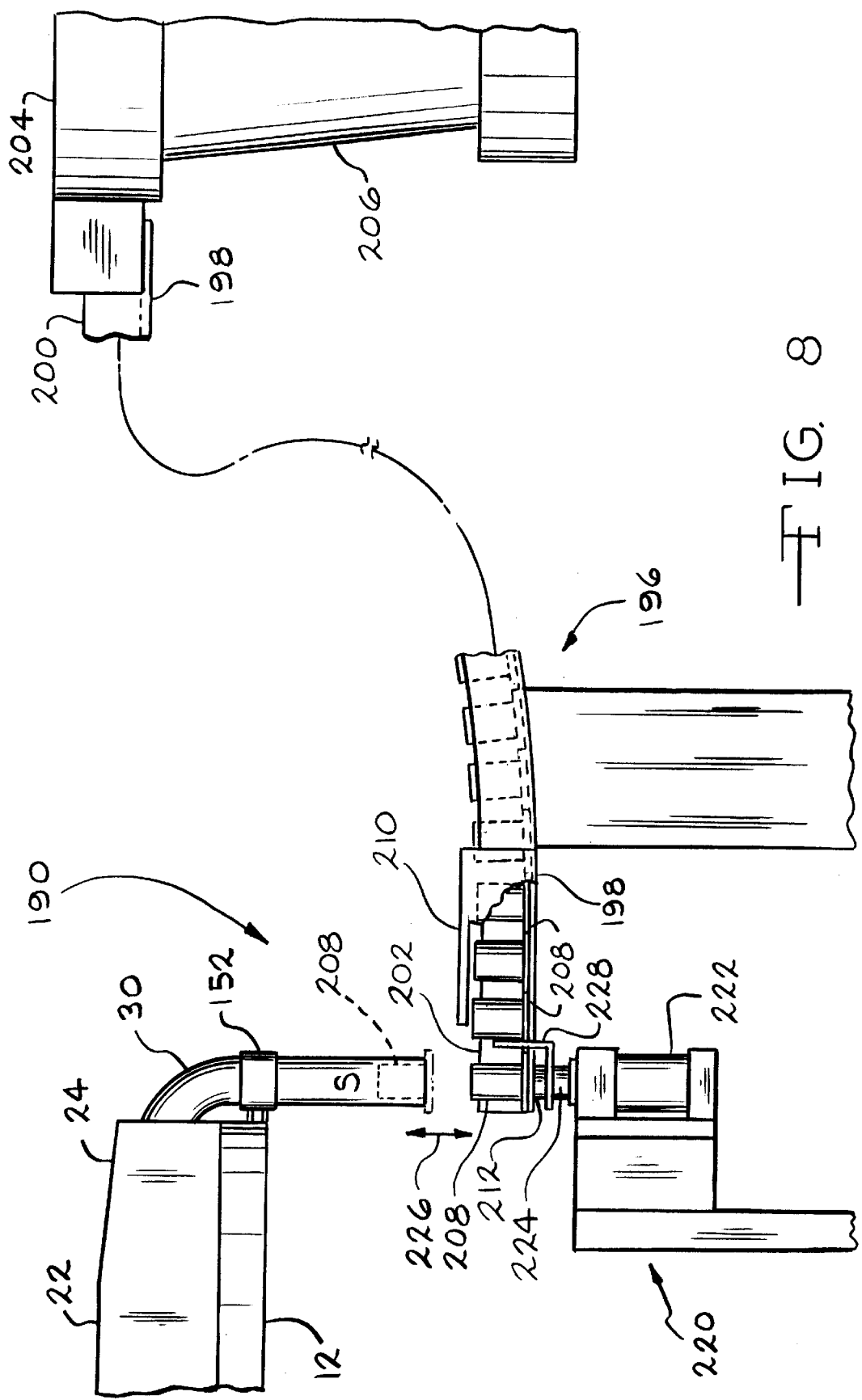
FIG. 8 is a side elevational view of a capping apparatus according to the present invention.

Referring to FIGS. 1 and 8, the apparatus 10 of the present invention includes at least one capping apparatus 190 positioned adjacent to the rotary table 12 at an install cap station 192. The capping apparatus 190 is in electrical communication with the computer C through an electrical line 194.

Referring to FIG. 8, each capping apparatus 190 includes a cap delivery assembly 196 having a cap chute 198 including a first end 200 and a second end 202. The first end 200 of the cap chute 198 is in communication with a conventional part feeder 204 having a bowl 206. The bowl 206 contains hose caps 208. The part feeder 204 feeds the hose caps 208 from the bowl 206 into the cap chute 198. The hose caps 208 are positioned in a line in the chute 198 as shown in FIG. 8. The second end 202 of the cap chute 198 includes a restricting plate 210 to limit the movement of the hose caps 208 in the chute. The second end further includes a rod opening 212.

Referring still to FIG. 8, each capping apparatus 190 includes a cap positioning assembly 220 that includes a cap positioning cylinder 222 having a reciprocating rod 224. Actuation of the cap positioning cylinder 222 causes reciprocal vertical movement of the reciprocating rod 224 in the directions indicated by arrow 226 in FIG. 8. A retaining blade 228 is mounted on the reciprocating rod 224. When the reciprocating rod 224 is actuated, the rod extends through the rod opening 212 of the chute 198 and engages a hose cap 208. The reciprocating rod 224 then inserts the hose cap 208 into the hose 30 as shown in FIG. 8. During this operation, the retaining blade 228 holds the line of hose caps 208 in position in the chute 198 until the first cap is installed and the reciprocating rod 224 has returned to a retracted or down position. At that point, the retaining blade 228 will be lower than the chute 198 and the next cap will slide into position at the rod opening 212.

Figure 9:
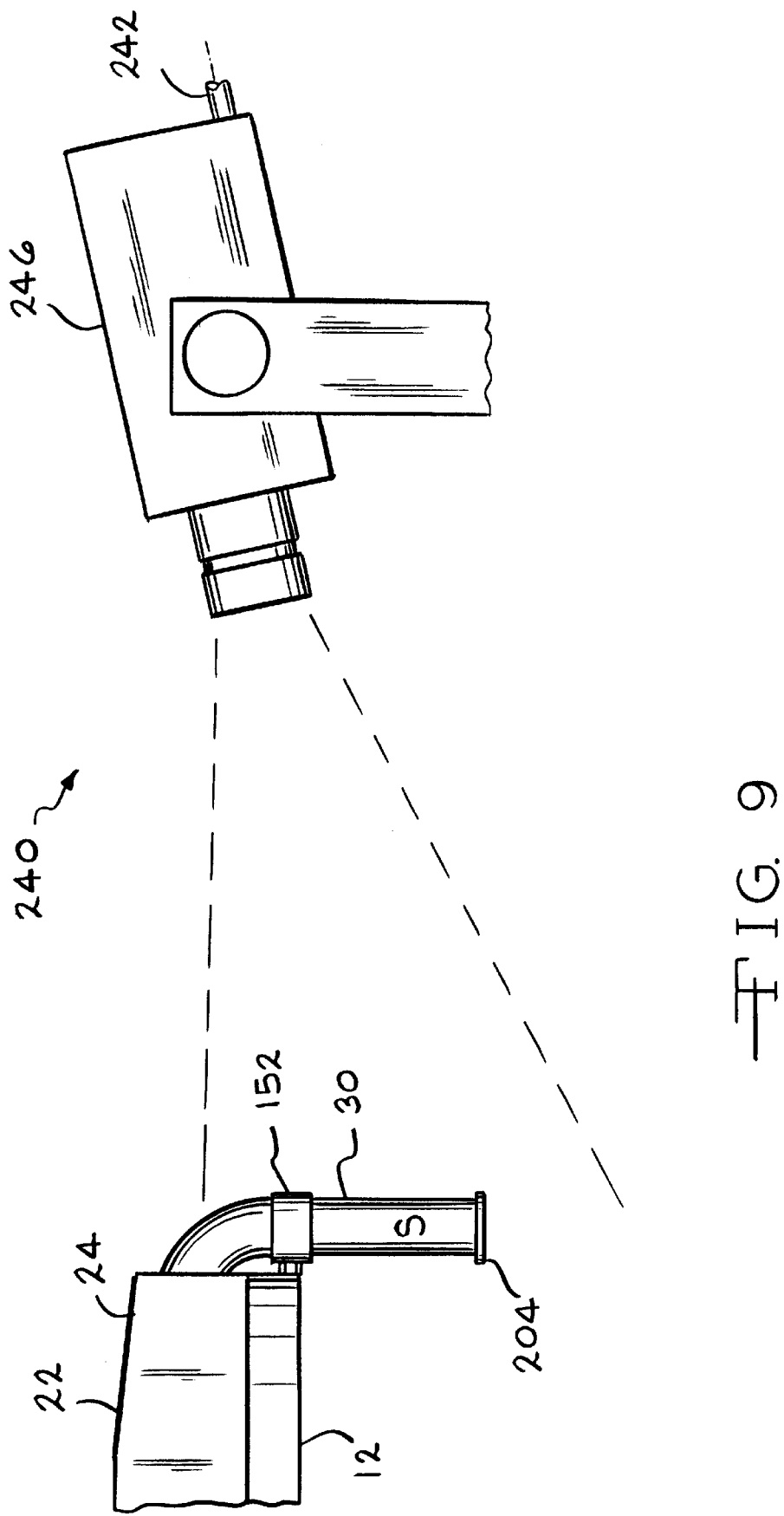
FIG. 9 is a side elevational view of an inspecting apparatus according to the present invention.

Referring to FIGS. 1 and 9, the apparatus 10 of the present invention includes at least one inspecting apparatus 240 that is positioned adjacent to the rotary table 12 at an inspect station 244. The inspecting apparatus 240 is in electrical communication with the computer C through an electrical line 242.

Referring to FIG. 9, each inspecting apparatus 240 is a conventional two-dimensional camera 246 that is capable of capturing data about the hose and transmitting such data to the computer C through the line 242. The data from the camera 246 are then computed by the computer C to determine if the hose 30 complies with predetermined criteria. If the computer C determines that the hose 30 does not comply, the apparatus 10 will stop operating and a warning signal will occur indicating that adjustments to the apparatus 10 are required. The data can also be downloaded to a printer (not shown) to produce printed copies showing useful information such as quality control results, date/time stamp, volume of parts in a container, shipping labels, operator codes and other information.

Referring to FIG. 1, the apparatus 10 of the present invention and the corresponding method therefor requires at least a load and unload station 36, a print station 72 and a trim station 102. Alternative embodiments of the apparatus 10 and the corresponding method can include the clip station 142, the install cap station 192 and the inspect station 244.

The above detailed description of the present invention is given for explanatory purposes. It will be apparent to those skilled in the art that numerous changes and modifications can be made without departing from the scope of the invention. Accordingly, the whole of the foregoing description is to be construed in an illustrative and not a limitative sense, the scope of the invention being defined solely by the appended claims.

I claim:

1. A hose preparation apparatus comprising:

a rotary table including at least one hose fixture having a recess for supporting a hose having a first hose end and a second hose end, said at least one hose fixture having a hose end retention apparatus including a first retention pin and a second retention pin for retaining said first and second hose ends, respectively, said first and second retention pins being movable in vertical directions with respect to said rotary table;

at least one printing apparatus being movable in vertical and rotational directions with respect to a hose supported by said hose fixture, said printing apparatus being positioned adjacent to said rotary table for printing a symbol on a hose supported by said hose fixture; and a trimming apparatus including a rotatable circular trimming blade positioned adjacent to said rotary table for trimming a hose supported by said hose fixture, said trimming blade being movable in a horizontal direction with respect to said rotary table.

2. The hose preparation apparatus of claim 1, wherein said hose preparation apparatus further includes clipping means positioned adjacent to said rotary table for positioning a clip on a hose supported by said hose fixture.

3. The hose preparation apparatus of claim 2, wherein said clipping means consists of at least one clipping apparatus.

4. The hose preparation apparatus of claim 1, wherein said hose preparation apparatus further includes capping means positioned adjacent to said rotary table for capping a hose supported by said rotary table.

5. The hose preparation apparatus of claim 4, wherein said capping means consists of at least one capping apparatus.

6. The hose preparation apparatus of claim 1, wherein said hose preparation apparatus further includes inspecting means positioned adjacent to said rotary table for inspecting a hose supported by said rotary table.

7. The hose preparation apparatus of claim 6, wherein said inspecting means consists of at least one inspection apparatus.

8. A method of preparing a hose comprising:

supporting a hose having a first hose end and a second hose end in a recess of a hose fixture on a rotary table and by a first retention pin and a second retention pin being inserted in said first and second hose ends, respectively, said first and second retention pins being movable in vertical directions with respect to said rotary table;

printing a symbol on said hose with at least one printing apparatus movable in vertical and rotational directions with respect to a hose supported by said hose fixture, said printing apparatus being positioned adjacent to said rotary table; and trimming said hose with a trimming apparatus including a rotatable circular trimming blade positioned adjacent to said rotary table, said trimming blade being movable in a horizontal direction with respect to said rotary table.

9. The method of preparing a hose of claim 8, wherein said method further includes clipping said hose with clipping means positioned adjacent to said rotary table.

10. The method of preparing a hose of claim 9, wherein said clipping means consists of at least one clipping apparatus.

11. The method of preparing a hose of claim 8, wherein said method further includes capping said hose with capping means positioned adjacent to said rotary table.

12. The method of preparing a hose of claim 11, wherein said capping means consists of at least one capping apparatus positioned adjacent to said rotary table.

13. The method of preparing a hose of claim 8, wherein said method further includes inspecting said hose with inspecting means positioned adjacent to said rotary table.

14. The method of preparing a hose of claim 13, wherein said inspecting means consists of at least one inspecting apparatus.

* * * * *